(12) United States Patent
Sainath et al.

(10) Patent No.: US 10,339,921 B2
(45) Date of Patent: Jul. 2, 2019

(54) MULTICHANNEL RAW-WAVEFORM NEURAL NETWORKS

(71) Applicant: Google LLC, Mountain View, CA (US)

(72) Inventors: Tara N. Sainath, Jersey City, NJ (US); Ron J. Weiss, New York, NY (US); Kevin William Wilson, Sleepy Hollow, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/987,146

(22) Filed: Jan. 4, 2016

(65) Prior Publication Data
US 2017/0092265 A1  Mar. 30, 2017

Related U.S. Application Data

(60) Provisional application No. 62/222,848, filed on Sep. 24, 2015.

(51) Int. Cl.
*G10L 15/00* (2013.01)
*G10L 15/16* (2006.01)
(Continued)

(52) U.S. Cl.
CPC ............ *G10L 15/16* (2013.01); *G06N 3/0445* (2013.01); *G06N 3/0454* (2013.01); *G06N 3/084* (2013.01); *G10L 15/34* (2013.01); *G10L 15/20* (2013.01); *G10L 21/0208* (2013.01); *G10L 2021/02082* (2013.01)

(58) Field of Classification Search
CPC ........ G06N 3/454; G06N 3/08; G06N 3/0445; G06N 3/084; G06N 3/088; G06N 3/02; G06N 3/049; G10L 15/16; G10L 25/30
See application file for complete search history.

(56) References Cited

U.S. PATENT DOCUMENTS

| 4,802,225 A | 1/1989 | Patterson |
| 5,737,485 A | 4/1998 | Flanagan |

(Continued)

OTHER PUBLICATIONS

Swietojanski et al, "Convolutional Neural Networks for Distant Speech Recognition," May 2014 publication, in IEEE Signal Processing Letters, vol. 21, No. 9, pp. 1120-1124.*

(Continued)

*Primary Examiner* — Olujimi A Adesanya
(74) *Attorney, Agent, or Firm* — Fish & Richardson P.C.

(57) ABSTRACT

Methods, systems, and apparatus, including computer programs encoded on computer storage media, for using neural networks. One of the methods includes receiving, by a neural network in a speech recognition system, first data representing a first raw audio signal and second data representing a second raw audio signal, the first raw audio signal and the second raw audio signal for the same period of time, generating, by a spatial filtering convolutional layer in the neural network, a spatial filtered output the first data and the second data, generating, by a spectral filtering convolutional layer in the neural network, a spectral filtered output using the spatial filtered output, and processing, by one or more additional layers in the neural network, the spectral filtered output to predict sub-word units encoded in both the first raw audio signal and the second raw audio signal.

25 Claims, 4 Drawing Sheets

(51) Int. Cl.
*G10L 15/34* (2013.01)
*G06N 3/04* (2006.01)
*G06N 3/08* (2006.01)
*G10L 15/20* (2006.01)
*G10L 21/0208* (2013.01)

(56) References Cited

U.S. PATENT DOCUMENTS

| | | | |
|---|---|---|---|
| 5,805,771 | A | 9/1998 | Muthusamy et al. |
| 7,072,832 | B1 | 7/2006 | Su et al. |
| 7,702,599 | B2* | 4/2010 | Widrow ............ G06F 17/30247 382/155 |
| 8,843,369 | B1 | 9/2014 | Sharifi |
| 9,286,524 | B1* | 3/2016 | Mei ...................... G06K 9/6273 |
| 9,390,712 | B2 | 7/2016 | Yu |
| 9,886,949 | B2 | 2/2018 | Li |
| 9,984,683 | B2 | 5/2018 | Li |
| 2005/0049855 | A1 | 3/2005 | Chong-White |
| 2009/0012638 | A1* | 1/2009 | Lou ........................ G11B 27/28 700/94 |
| 2010/0057453 | A1 | 3/2010 | Valsan |
| 2012/0065976 | A1* | 3/2012 | Deng ...................... G10L 15/14 704/256.1 |
| 2012/0275690 | A1* | 11/2012 | Melvin .............. G06K 9/00979 382/156 |
| 2014/0278383 | A1* | 9/2014 | Fan ......................... G10L 25/84 704/224 |
| 2014/0288928 | A1* | 9/2014 | Penn ....................... G10L 15/16 704/232 |
| 2015/0032449 | A1 | 1/2015 | Sainath |
| 2015/0058004 | A1 | 2/2015 | Dimitriadis et al. |
| 2015/0066496 | A1* | 3/2015 | Deoras ................... G10L 15/16 704/232 |
| 2015/0095026 | A1 | 4/2015 | Bisani |
| 2015/0095027 | A1 | 4/2015 | Parada San Martin |
| 2015/0161995 | A1* | 6/2015 | Sainath .................. G10L 15/16 704/232 |
| 2015/0340034 | A1 | 11/2015 | Schalkwyk |
| 2016/0284346 | A1 | 9/2016 | Visser |
| 2016/0284347 | A1 | 9/2016 | Sainath et al. |
| 2016/0358602 | A1 | 12/2016 | Krishnaswamy |
| 2016/0358619 | A1 | 12/2016 | Ramprashad |
| 2018/0068675 | A1* | 3/2018 | Variani .................. G10L 25/30 |
| 2018/0174575 | A1 | 6/2018 | Bengio |
| 2018/0197534 | A1 | 7/2018 | Li |

OTHER PUBLICATIONS

Palaz et al, "Estimating phoneme class conditional probabilities from raw speech signal using convolutional neural networks." 2013, arXiv preprint arXiv:1304.1018 (2013), pp. 1-5.*
Sainath, Tara N, "Improvements to deep neural networks for large vocabulary continuous speech recognition tasks.", Jan. 2014, IBM TJ Watson Research Center (2014), pp. 1-57.*
Huang et al, "An analysis of convolutional neural networks for speech recognition.", Aug. 6, 2015, Acoustics, Speech and Signal Processing (ICASSP), 2015 IEEE International Conference on. IEEE, 2015, pp. 4989-4993.*
Renals et al, "Neural networks for distant speech recognition.", May 2014, Hands-free Speech Communication and Microphone Arrays (HSCMA), 2014 4th Joint Workshop on. IEEE, 2014, pp. 1-5.*
Ganapathy et al, "Robust language identification using convolutional neural network features", 2014,. In Fifteenth Annual Conference of the International Speech Communication Association, pp. 1-5.*
Abdel-Hamid et al. "Applying convolutional neural networks concepts to hybrid NN-HMM model for speech recognition.", 2012, Acoustics, Speech and Signal Processing (ICASSP), 2012 IEEE International Conference on. IEEE, 2012.*
Zeng et al., "Convolutional Neural Networks for human activity recognition using mobile sensors," Nov. 2014, 6th International Conference on Mobile Computing, Applications and Services, Austin, TX, 2014, pp. 197-205.*

Abdel-Hamid et al, "Applying Convolutional Neural Networks concepts to hybrid NN-HMM model for speech recognition," 2012, IEEE International Conference on Acoustics, Speech and Signal Processing (ICASSP), Kyoto, 2012, pp. 4277-4280.*
Mohamed, Abdel-rahman, "Deep neural network acoustic models for asr." 2014, PhD diss., 2014, pp. 1-120.*
Chang et al, "Robust CNN-based speech recognition with Gabor filter kernels.", 2014, Fifteenth annual conference of the international speech communication association. 2014, pp. 1-5.*
Chan et al, "Deep convolutional neural networks for acoustic modeling in low resource languages." Apr. 2015, Acoustics, Speech and Signal Processing (ICASSP), 2015 IEEE International Conference on. IEEE, 2015, pp. 2056-2060.*
Chen et al. "Deepsentibank: Visual sentiment concept classification with deep convolutional neural networks." 2014, arXiv preprint arXiv:1410.8586 (2014), pp -7.*
Sainath et al, "Speaker location and microphone spacing invariant acoustic modeling from raw multichannel waveforms", Dec. 2015, In Automatic Speech Recognition and Understanding (ASRU), 2015 IEEE Workshop on Dec. 13, 2015 (pp. 30-36). IEEE.*
"Voice activity detection," from Wikipedia, the free encyclopedia, last modified on Jul. 23, 2015 [retrieved on Oct. 21, 2015]. Retrieved from the Internet: URL<htp://en.wikipedia.org/wiki/Voice_activity_detection>, 5 pages.
Allen and Berkley, "Image method for efficiently simulating small-room acoustics," J. Acoust. Soc. Am. 65(4):943-950, Apr. 1979.
Benesty et al., "Microphone Array Signal Processing," Springer Topics in Signal Processing, 2008, 193 pages.
Brandstein and Ward, "Microphone Arrays: Signal Processing Techniques and Applications," Digital Signal Processing, 2001, 258 pages.
Burlick et al., "An Augmented Multi-Tiered Classifier for Instantaneous Multi-Modal Voice Activity Detection," INTERSPEECH 2013, 5 pages, Aug. 2013.
Chuangsuwanich and Glass, "Robust Voice Activity Detector for Real World Applications Using Hannonicity and Modulation frequency," INTERSPEECH, pp. 2645-2648, Aug. 2011.
Dean et al., "Large Scale Distributed Deep Networks," Advances in Neural Information Processing Systems 25, pp. 1232-1240, 2012.
Delcroix et al., "Linear Prediction-Based Dereverberation With Advanced Speech Enhancement and Recognition Technologies for The Reverb Challenge," Reverb Workshop 2014, pp. 1-8, 2014.
Ferroni et al., "Neural Networks Based Methods for Voice Activity Detection in a Multi-room Domestic Environment," Proc. of EVALITA as part of XIII AI*IA Symposium on Artificial Intelligence, vol. 2, pp. 153-158, 2014.
Ghosh et al., "Robust Voice Activity Detection Using Long-Term Signal Variability," IEEE Transactions on Audio, Speech, and Language Processing, 19(3):600-613, Mar. 2011.
Giri et al., "Improving Speech Recognition in Reverberation Using a Room-Aware Deep Neural Network and Multi-Task Learning," 2015 IEEE International Conference on Acoustics, Speech and Signal Processing (ICASSP), pp. 5014-5018, Apr. 2015.
Glorot and Bengio, "Understanding the difficulty of training deep feedforward neural networks," Proceedings of the International Conference on Artificial Intelligence and Statistics (AISTATS'10), pp. 249-256, 2010.
Graves et al., "Speech Recognition With Deep Recurrent Neural Networks," Acoustics, Speech and Signal Processing (ICASSP), 2013 IEEE International Conference on, pp. 6645-6649, 2013.
Hain et al., "Transcribing Meetings With the AMIDA Systems," IEEE Transactions on Audio, Speech, and Language Processing, 20(2):486-498, Feb. 2012.
Heigold et al., "Asynchronous Stochastic Optimization for Sequence Training of Deep Neural Networks," 2014 IEEE International Conference on Acoustic, Speech and Signal Processing, pp. 5624-5628, 2014.
Hinton et al., "Deep Neural Networks for Acoustic Modeling in Speech Recognition," Signal Processing Magazine, IEEE, 29(6):82-97, Apr. 2012.
Hoshen et al., "Speech Acoustic Modeling From Raw Multichannel Waveforms," International Conference on Acoustics, Speech, and Signal Processing, pp. 4624-4628, Apr. 2015.

(56) References Cited

OTHER PUBLICATIONS

Hughes and Mierle, "Recurrent Neural Networks for Voice Activity Detection," Acoustics, Speech and Signal Processing (ICASSP), 2013 IEEE International Conference on, pp. 7378-7382, May 2013.
Kello and Plant, "A neural network model of the articulatory-acoustic forward mapping trained on recordings of articulatory parameters," J. Acoust. Soc. Am. 116 (4), Pt. 1, pp. 2354-2364, Oct. 2004.
Maas et al., "Recurrent Neural Networks for Noise Reduction in Robust ASR," INTERSPEECH 2012, 4 pages, 2012.
Misra, "Speech/Nonspeech Segmentation in Web Videos," Proceedings of INTERSPEECH 2012, 4 pages, 2012.
Narayanan and Wang, "Ideal Ratio Mask Estimation Using Deep Neural Networks for Robust Speech Recognition," Acoustics, Speech and Signal Processing (ICASSP), 2013 IEEE International Conference on, pp. 7092-7096, May 2013.
Sainath et al., "Convolutional, Long Short-Term Memory, Fully Connected Deep Neural Networks," Acoustics, Speech and Signal Processing (ICASSP), 2015 IEEE International Conference on, pp. 4580-4584, Apr. 2015.
Sainath et al., "Deep Convolutional Neural Networks for LVCSR," Acoustics, Speech and Signal Processing (ICASSP), 2013 IEEE International Conference on, pp. 8614-8618, 2013.
Sainath et al., "Improvements to Deep Convolutional Neural Networks for LVCSR," In Automatic Speech Recognition and Understanding (ASRU), 2013 IEEE Workshop on, pp. 315-320, 2013.
Sainath et al., "Learning the Speech Front-end With Raw Waveform CLDNNs," Proc. INTERSPEECH 2015, 5 pages.
Sak et al., "Long Short-Term Memory Based Recurrent Neural Network Architectures for Large Vocabulary Speech Recognition," arXiv:1402.1128v1 [cs.NE], Feb. 2014, 5 pages.
Seltzer et al., "Likelihood-Mazimizing Beamforming for Robust Hands-Free Speech Recognition," IEEE Transactions on Speech and Audio Processing, 12(5):489-498, Sep. 2004.
Stolcke et al., "The SRI-ICSI Spring 2007 Meeting and Lecture Recognition System," Proc. NIST Rich Transcription Workshop, Springer Lecture Notes in Computer Science, 14 pages, 2007.
Thomas et al., "Improvements to the IBM Speech Activity Detection System for the DARPA RATS Program," Proceedings of IEEE International Conference on Audio, Speech and Signal Processing (ICASSP), pp. 4500-4504, Apr. 2015.
Van Veen and Buckley, "Beamforming: A Versatile Approach to Spatial Filtering," ASSP Magazine, IEEE, 5(2):4-24, Apr. 1988.
Weiss and Kristjansson, "DySANA: Dynamic Speech and Noise Adaptation for Voice Activity Detection," Proc. of INTERSPEECH 2008, pp. 127-130, 2008.
Yu et al., "Feature Learning in Deep Neural Networks—Studies on Speech Recognition Tasks," arXiv:1301.3605v3 [cs.LG], pp. 1-9, Mar. 2013.
Zelinski, "A Microphone Array With Adaptive Post-Filtering for Noise Reduction in Reverberant Rooms," Acoustics, Speech, and Signal Processing, 1988. ICASSP-88., 1988 International Conference on, vol. 5, pp. 2578-2581, Apr. 1988.
Zhang and Wang, "Boosted Deep Neural Networks and Multi-resolution Cochleagram Features for Voice Activity Detection," INTERSPEECH 2014, pp. 1534-1538, Sep. 2014.
Eyben et al., "Real-life voice activity detection with LSTM Recurrent Neural Networks and an application to Hollywood movies," 2013 IEEE International Conference on Acoustics, Speech and Signal Processing (ICASSP); May 2013, Institute of Electrical and Electronics Engineers, May 26, 2013, pp. 483-487, XP032509188.
International Search Report and Written Opinion in International Application No. PCT/US2016/043552, dated Sep. 23, 2016, 12 pages.
Thomas et al., "Analyzing convolutional neural networks for speech activity detection in mismatched acoustic conditions," 2014 IEEE International Conference on Acoustics, Speech and Signal Processing (ICASSP), IEEE, May 4, 2014, pp. 2519-2523, XP032617994.
International Preliminary Report on Patentability issued in International Application No. PCT/US2016/043552, dated Apr. 5, 2018, 8 pages.
Nakatani et al. "Investigation of Deep Neural Network and Cross-Adaptation for Voice Activity Detection in Meeting Speech," Technical Research Report of the Institute of Electronics, Information and communication Engineers, Japan, Dec. 2014,6 pages (English Abstract).
Office Action issued in Japanese Application No. 2017-556929, dated Jul. 13, 2018, 3 pages (English translation).
Korean Office Action issued in Korean Application No. 10-2017-7031606, dated Jan. 17, 2019, 12 pages (with English Translation).
Palaz et al. "Convolutional Neural Networks Based Continuous Speech Recognition," ICASSP, Apr. 24, 2015, 5 pages.
Taiwanese office Action issued in Taiwanese Application No. 10-2017-7031606, dated Jan. 17, 2019, 12 pages (with English Translation).
Davis and Mermelstein, "Comparison of Parametric Representations for Monosyllabic Word Recognition in Continuously Spoken Sentences ," IEEE Transactions on Acoustics, Speech and Signal Processing, 28(4):357-366, Aug. 1980.
Geiger, Jürgen T., et al. "Robust speech recognition using long short-term memory recurrent neural networks for hybrid acoustic modelling." Interspeech, Sep. 2014, 5 pages.
Glasberg and Moore, "Derivation of auditory filter shapes from notched-noise data," Hearing Research, vol. 47, No. 1, pp. 103-138, Aug. 1990.
Hochreiter and Schmidhuber, "Long Short-Term Memory," Neural Computation, vol. 9, No. 8, pp. 1735-1780, Nov. 1997.
Isogai et al. "Dynamic Programming—Automatic Endpoint Detection for Neural Network Speech Recognition," Paper of the Japan Acoustical Society Research Presentation Conference, Spring I, Mar. 1990, (English Abstract).
Jaitly and Hinton, "Learning a Better Representation of Speech Sound Waves Using Restricted Boltzmann Machines," in Proc. ICASSP, May 2011, 4 pages.
Japanese Office Action issued in Japanese Application No. 2017-556929, dated Dec. 3, 2018, 6 pages (with English translation).
Kim and Chin, "Sound Source Separation Algorithm Using Phase Difference and Angle Distribution Modeling Near the Target," in Proc. INTERSPEECH, Sep. 2015, 5 pages.
Liu, YuIan, Pengyuan Zhang, and Thomas Hain. "Using neural network front-ends on far field multiple microphones based speech recognition." Acoustics, Speech and Signal Processing (ICASSP), 2014 IEEE International Conference on. IEEE, May 2014, 5 pages.
Mohamed et al., "Understanding how Deep Belief Networks Perform Acoustic Modelling," in ICASSP, Mar. 2012, pp. 4273-4276.
Palaz, Dimitri, and Ronan Collobert. "Analysis of cnn-based speech recognition system using raw speech as input," No. EPFL-REPORT-210039. ldiap, Jun. 2015, 7 pages.
Patterson et al., "An efficient auditory filterbank based on the gammatone function," in a meeting of the IOC Speech Group on Auditory Modelling at RSRE, vol. 2, No. 7, 1987, 33 pages.
Sainath. "Towards End-to-End Speech Recognition Using Deep Neural Networks," PowerPoint presentation, Deep Learning Workshop, ICML, Jul. 10, 2015, 51 pages.
Schluter et al., "Gammatone Features and Feature Combination for Large Vocabulary Speech Recognition," Acoustics, Speech and Signal Processing, 2007. ICASSP 2007. IEEE International Conference on, pp. IV-649-IV-652, Apr. 2007.
Soltau et al., "The IBM Attila speech recognition toolkit," in Proc. IEEE Workshop on Spoken Language Technology, 2010, Dec. 2010, pp. 97-102.
Stolcke et al., "The SRI-ICSI Spring 2007 Meeting and Lecture Recognition System," Multimodal Technologies for Perception of Humans, vol. Lecture Notes in Computer Science, No. 2, pp. 450-463, 2008.
Swietojanski et al., "Hybrid Acoustic Models for Distant and Multichannel Large Vocabulary Speech Recognition," Automatic Speech Recognition and Understanding (ASRU), 2013 IEEE Workshop on. IEEE, Dec. 2013, pp. 285-290.

(56) References Cited

OTHER PUBLICATIONS

Tuske et al., "Acoustic Modeling with Deep Neural Networks using Raw Time Signal for LVCSR," in Proc. INTERSPEECH, Sep. 2014, pp. 890-894.

* cited by examiner

MULTICHANNEL RAW-WAVEFORM NEURAL NETWORKS

CROSS-REFERENCE TO RELATED APPLICATIONS

This application claims the benefit of U.S. Provisional Application No. 62/222,848, filed on Sep. 24, 2015, the contents of which are incorporated herein by reference.

BACKGROUND

In some environments, speech recognition performance may degrade when a microphone is far from a speaker due to reverberation and additive noise. Some systems may use multiple microphones to enhance the speech signal and reduce the impact of reverberation and noise.

SUMMARY

In general, one innovative aspect of the subject matter described in this specification can be embodied in methods that include the actions of receiving, by a neural network in a speech recognition system, first data representing a first raw audio signal and second data representing a second raw audio signal, the first raw audio signal and the second raw audio signal for the same period of time, generating, by a spatial filtering convolutional layer in the neural network, a spatial filtered output the first data and the second data, generating, by a spectral filtering convolutional layer in the neural network, a spectral filtered output using the spatial filtered output, and processing, by one or more additional layers in the neural network, the spectral filtered output to predict sub-word units encoded in both the first raw audio signal and the second raw audio signal. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of training, by a speech recognition system, a neural network that includes a spatial filtering convolutional layer and a spectral filtering convolutional layer by: predicting clean log-mel features by processing two clean audio signals for the same period of time, each encoding one or more sub-word units, using the spatial filtering convolutional layer, the spectral filtering convolutional layer, and a multi-task module, predicting context dependent states by processing a noisy audio signal encoding the one or more sub-word units using the spatial filtering convolutional layer, the spectral filtering convolutional layer, and one or more denoising layers, determining a first gradient using a first accuracy of the clean log-mel features, determining a second gradient using a second accuracy of the context dependent states, generating a final gradient by weighting the first gradient and weighting the second gradient and combining the weighted first gradient and the weighted second gradient, and backward propagating the final gradient to train the neural network. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include causing a device to perform an action using the predicted sub-word units in response to processing, by the additional layers in the neural network, the spectral filtered output.

In some implementations, generating, by the spatial filtering convolutional layer in the neural network, the spatial filtered output the first data and the second data may include filtering the first data and the second data using short-duration multichannel time convolution filters which map multichannel inputs to a single channel. Generating, by the spatial filtering convolutional layer in the neural network, the spatial filtered output the first data and the second data may include filtering the first data and the second data using multiple finite impulse response filters. Generating, by the spatial filtering convolutional layer in the neural network, the spatial filtered output the first data and the second data may include filtering the first data using each of a plurality of filters, and filtering the second data using each of the plurality of filters. Generating, by the spatial filtering convolutional layer in the neural network, the spatial filtered output the first data and the second data may include generating a first quantity of first samples from the first data, generating a second quantity of second samples from the second data, the second quantity and the first quantity being the same quantity, striding by one in time across each of the first samples to generate first spatial output, and striding by one in time across each of the second samples to generate second spatial output. Generating, by the spatial filtering convolutional layer in the neural network, the spatial filtered output the first data and the second data may include summing first values in the first spatial output with corresponding values in the second spatial output to generate an output feature map. The spatial filtered output may be the output feature map.

In some implementations, generating, by the spatial filtering convolutional layer in the neural network, the spatial filtered output the first data and the second data may include generating the spatial filtered output using a first time convolution. Generating, by the spectral filtering convolutional layer in the neural network, the spectral filtered output using the spatial filtered output may include generating the spectral filtered output using a second time convolution with a second duration longer than a first duration of the first time convolution. Generating, by the spectral filtering convolutional layer in the neural network, the spectral filtered output using the spatial filtered output may include pooling the spatial filtered output in time to generate a pooled output. Pooling the spatial filtered output in time to generate the pooled output may include non-overlapping max pooling the spatial filtered output along the frequency axis. Pooling the spatial filtered output in time to generate the pooled output may include using a pooling size of three to generate the pooled output. Generating, by the spectral filtering convolutional layer in the neural network, the spectral filtered output may include generating the spectral filtered output by applying a rectified non-linearity to the pooled output.

In some implementations, processing, by the one or more additional layers in the neural network, the spectral filtered output to predict sub-word units encoded in both the first raw audio signal and the second raw audio signal may include processing, by a long short-term memory deep neural network included in the neural network, the spectral filtered output to predict sub-word units encoded in both the first raw audio signal and the second raw audio signal. Processing, by the long short-term memory deep neural network included in the neural network, the spectral filtered output to predict sub-word units encoded in both the first raw audio signal and the second raw audio signal may include processing, by a linear low-rank projection layer in the neural network, the spectral filtered output to generate a first intermediate output, and processing, by a long short-term memory layer in the long short-term memory deep neural network, the first intermediate output to generate a second intermediate output. Processing, by the long short-term memory deep neural network included in the neural network, the spectral filtered output to predict sub-word units encoded in both the first raw audio signal and the second raw audio signal may include processing, by a deep neural network layer in the long short-term memory deep neural network, data from the second intermediate output to predict the sub-word units encoded in both the first raw audio signal and the second raw audio signal.

In some implementations, the method may include generating each of the noisy audio signals from a respective one of the clean audio signals by adding noise to the respective clean audio signal. Predicting the clean log-mel features by processing the two clean audio signals for the same period of time, each encoding the one or more sub-word units, using the spatial filtering convolutional layer, the spectral filtering convolutional layer, and the multi-task module may include generating, by the spatial filtering convolutional layer, a spatial filtered output. Predicting the clean log-mel features by processing the two clean audio signals for the same period of time, each encoding the one or more sub-word units, using the spatial filtering convolutional layer, the spectral filtering convolutional layer, and the multi-task module may include generating, by the spectral filtering convolutional layer, a spectral filtered output using the spatial filtered output. Predicting the clean log-mel features by processing the two clean audio signals for the same period of time, each encoding the one or more sub-word units, using the spatial filtering convolutional layer, the spectral filtering convolutional layer, and the multi-task module may include processing, by the multi-task module, the spectral filtered output to predict clean log-mel features for the clean audio signal.

In some implementations, predicting the context dependent states by processing the two noisy audio signals for the same period of time, each encoding the one or more sub-word units, using the spatial filtering convolutional layer, the spectral filtering convolutional layer, and the one or more denoising layers may include generating, by the spatial filtering convolutional layer, a spatial filtered output. Predicting the context dependent states by processing the two noisy audio signals for the same period of time, each encoding the one or more sub-word units, using the spatial filtering convolutional layer, the spectral filtering convolutional layer, and the one or more denoising layers may include generating, by the spectral filtering convolutional layer, a spectral filtered output using the spatial filtered output. Predicting the context dependent states by processing the two noisy audio signals for the same period of time, each encoding the one or more sub-word units, using the spatial filtering convolutional layer, the spectral filtering convolutional layer, and the one or more denoising layers may include processing, by the denoising layers, the spectral filtered output to predict dependent states for the noisy audio signal. The method may include providing the spatial filtering convolutional layer, the spectral filtering convolutional layer, and the multi-task module to a device for predicting sub-word units encoded in both a first raw audio signal and a second raw audio signal for the same period of time.

The subject matter described in this specification can be implemented in particular embodiments and may result in one or more of the following advantages. In some implementations, a speech recognition system that uses a neural network as described below may have a reduced word error rate. In some implementations, a speech recognition system may use multi-task learning during a neural network learning process to enhance a received signal, suppress noise, improve the learning process, or a combination of two or more of these. In some implementations, a speech recognition system may use a spatial filtering layer and a separate spectral filtering layer to design the spatial filtering layer to be spatially selective, while implementing a frequency decomposition shared across all spectral filters in the spectral filtering layer. In some implementations, a spectral filtering layer can learn a decomposition with better frequency resolution than a spatial filtering layer, may be incapable of doing any spatial filtering, or both. In some implementations, a speech recognition system may use multi-task learning to de-noise and de-reverberate features from an audio signal while classifying the features.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a speech recognition system includes a neural network, e.g., a convolutional long short-term memory deep neural network (CLDNN), with a spatial filtering convolutional layer and a spectral filtering convolutional layer to process audio signals, e.g., raw audio signals. The neural network may include the two convolutional layers to process multichannel input, e.g., multiple audio signals from different microphones when each audio signal represents sound from the same period of time. The speech recognition system may use the multichannel input to enhance a representation of words spoken by a user, and encoded in the audio signals, compared to other sound, e.g., noise, encoded in an audio signal, and to reduce a word error rate.

In some implementations, the neural network may use multi-task learning during a learning process. For example, the neural network may include two different architectures each with one or more deep neural network layers after a long short-term memory layer and the two convolutional layers to process "clean" and "noisy" audio signals that encode the same words or sub-word units. The neural network may include a particular layer or group of layers in both architectures such that the particular layers are trained during processing of both the "clean" and the "noisy" audio signals while other layers are trained during processing of only a single type of audio signal, either clean or noisy but not both.

For instance, the neural network processes the "clean" audio signal using the deep neural network layers and the "noisy" audio signal using other neural network layers, e.g., two long short-term memory layers and a different deep neural network layer, to determine two output values, one for each of the audio signals. The neural network determines a difference between the errors of the two output values, or between the gradients for the two output values, and uses the difference to determine a final gradient for a training process. The neural network uses the final gradient during backward propagation.

Figure 1:
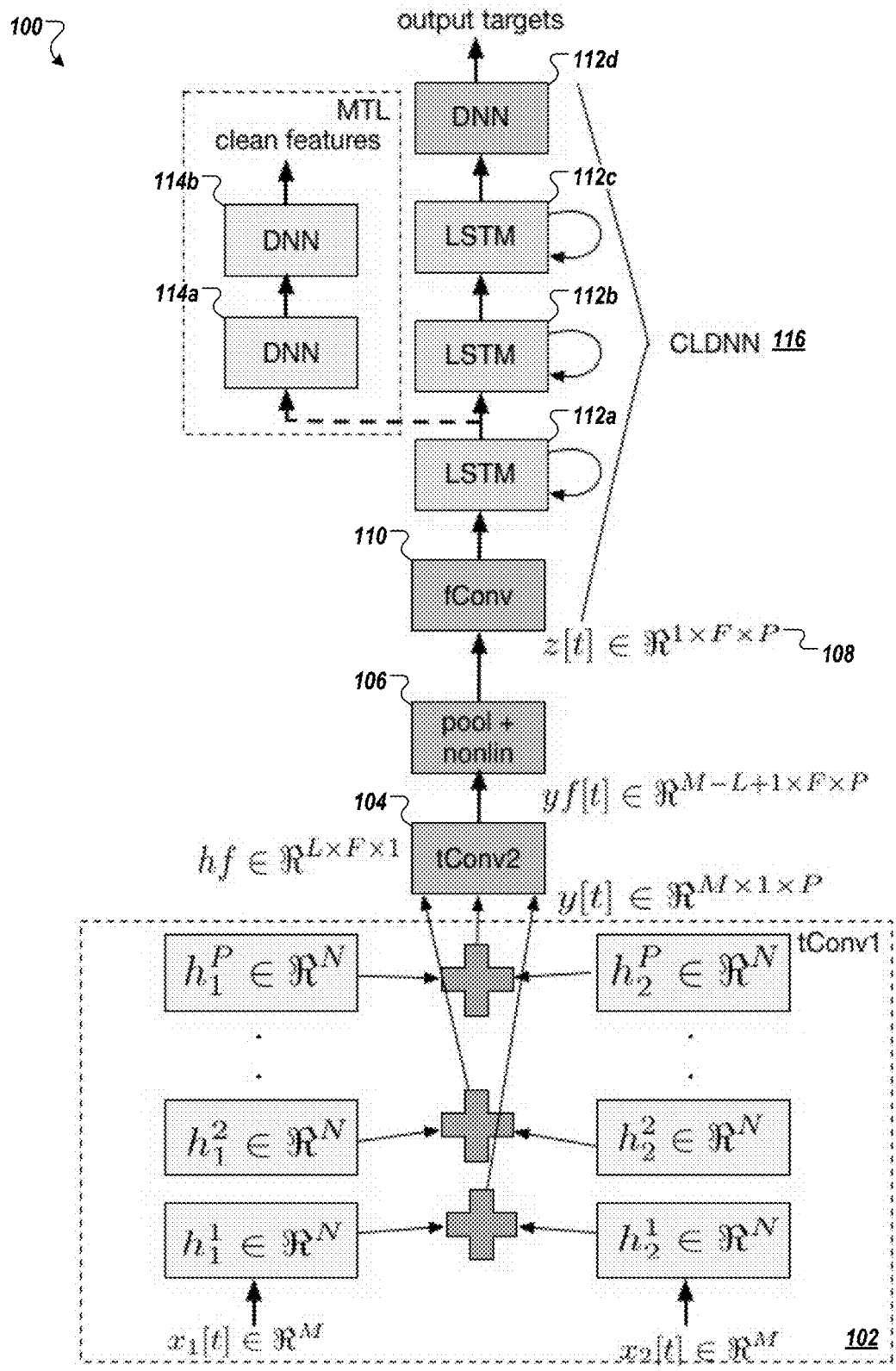
FIG. 1 is an example of a multichannel speech recognition system that includes a multichannel spatial filtering convolutional layer and a separate spectral filtering convolutional layer as part of a single neural network

FIG. 1 is an example of a multichannel speech recognition system 100 that includes a multichannel spatial filtering convolutional layer 102 and a separate spectral filtering convolutional layer 104 as part of a single neural network. The multichannel spatial filtering convolutional layer 102 generates a spatial filtered output from multichannel audio input, e.g., two or more audio signals when each audio signal is created by a different microphone for the same period of time. The multichannel spatial filtering convolutional layer 102 may include short-duration multichannel time convolution filters which map multichannel inputs down to a single channel. During training, the multichannel spatial filtering convolutional layer 102 learns several filters, each of which are used to "look" in different directions in space for a location of a speaker of a word or sub-word unit encoded in the audio signals.

The spectral filtering convolutional layer 104 receives the spatial filtered output, e.g., the single channel output from each of the filters in the spatial filtering convolutional layer 102. The spectral filtering convolutional layer 104 may have a longer-duration time convolution, compared to the spatial filtering convolutional layer 102, and may perform finer frequency resolution spectral decomposition, e.g., analogous to a time-domain auditory filterbank.

The system 100 applies a pooling function and a rectified non-linearity function, using layer 106, to the output of layer 104 to generate a spectral filtered output 108. The system 100 provides the spectral filtered output 108 to a frequency convolutional layer 110. The frequency convolutional layer 110 processes the spectral filtered output 108 and provides a frequency-convolved output to another layer in the multichannel speech recognition system 100, e.g., a long short term memory (LSTM) layer 112a.

For example, the multichannel spatial filtering convolutional layer 102 may receive two channels of audio signals, $x_1[t]$ and $x_2[t]$. The multichannel spatial filtering convolutional layer 102 receives each of the channels from a respective microphone c at time t. In some examples, the multichannel spatial filtering convolutional layer 102 receives more than two channels. For filters $p \in P$, $h_c^p[n]$ is the $n^{th}$ tap of the filter p associated with microphone c. The output $y^p[t]$ of filter $p \in P$ is defined by Equation (1) below for C microphones when N is the order, or size, of the finite impulse response (FIR) filters.

$$y^p[t] = \Sigma_{c=0}^{C-1} \Sigma_{n=0}^{N-1} h_c^p[n] x_c[t-n] \quad (1)$$

The multichannel spatial filtering convolutional layer 102 may model Equation (1) and perform a multichannel time-convolution with a FIR spatial filterbank. For instance, the multichannel speech recognition system 100 may select a window of a raw audio signal of length M samples for each channel C, denoted as $\{x_1[t], x_2[t], \ldots, x_C[t])\}$ for $t \in 1, \ldots, M$. The multichannel spatial filtering convolutional layer 102 convolves each channel c for each of the samples $x_C[t]$ by a filter $p \in P$ with an order of N, for a total of P filters $h_c = \{h_c^1, h_c^2, \ldots h_c^P\}$. In some examples, the multichannel spatial filtering convolutional layer 102 has two or more, e.g., ten, spatial filters. In some examples, the multichannel spatial filtering convolutional layer 102 has more than ten spatial filters.

The multichannel spatial filtering convolutional layer 102 strides by one in time across M samples and performs a "full" convolution, such that the output, e.g., each feature maps, for each filter $p \in P$ remains length M, e.g., the length of each filter map for the multichannel spatial filtering convolutional layer 102 is the same as the length of the input. The multichannel spatial filtering convolutional layer 102 sums the outputs from each channel $c \in C$ to create an output feature map of size $y^p[t] \in R^{M \times 1 \times P}$. Dimension M corresponds to time, e.g., sample index, dimension 1 corresponds to frequency, e.g., spatial filter index, and dimension P corresponds to look direction, e.g., feature map index.

The spectral filtering convolutional layer 104 includes longer-duration filters than the multichannel spatial filtering convolutional layer 102. The filters in the spectral filtering convolutional layer 104 are single-channel filters. The spectral filtering convolutional layer 104 receives the P feature maps from the multichannel spatial filtering convolutional layer 102 and performs time convolution on each of the P feature maps. The spectral filtering convolutional layer 104 may use the same time convolution across all P feature maps. The spectral filtering convolutional layer 104 includes filters $g \in R^{L \times F \times 1}$ where 1 indicates sharing across the P input feature maps, e.g., sharing of the same time convolution. The spectral filtering convolutional layer 104 produces an output $w[t] \in R^{M-L+1 \times F \times P}$ such that $w[t] = yf[t]$ as shown in FIG. 1.

The multichannel speech recognition system 100 pools the filterbank output w[t] in time, e.g., to discard short-time information, over the entire time length of the output signal w[t], to produce an output with dimensions $1 \times F \times P$. The multichannel speech recognition system 100 applies a rectified non-linearity to the pooled output, and may apply a stabilized logarithm compression, to produce a frame-level feature vector z[t] at time t, e.g., $z[t] \in R^{1 \times F \times P}$. For instance the spectral filtering convolutional layer 104 includes a pooling and non-linearity layer 106 that pools the output, e.g., to discard short-time phase information, and applies the rectified non-linearity.

In some implementations, the multichannel speech recognition system 100, as part of the stabilized logarithm compression, may use a small additive offset to truncate the output range and avoid numerical problems with very small inputs. For instance, the multichannel speech recognition system 100 may apply log (•+0.01) to the pooled output when producing the frame-level feature vector z[t].

The multichannel speech recognition system 100 may shift a window along the raw audio signal, e.g., by a small frame hop such as 10 milliseconds, and repeat the time convolution to produce a set of time-frequency-direction frames, e.g., at 10 millisecond intervals. For example, the multichannel speech recognition system 100 may process another audio signal using the multichannel spatial filtering convolutional layer 102 and the spectral filtering convolutional layer 104.

The output out of the spectral filtering convolutional layer 104 produces a frame-level feature, denoted as $z[t] \in R^{1 \times F \times P}$ In some examples, the output z[t] of the spectral filtering convolutional layer 104, e.g., the combined output of the multichannel spatial filtering convolutional layer 104, including the layer 106, and the spectral filtering convolutional layer 102, is the Cartesian product of all spatial and spectral filters.

The multichannel speech recognition system 100 may provide the output z[t] to a convolutional long short-term memory deep neural network (CLDNN) block 116 in the CLDNN. The CLDNN block 116 includes a frequency convolutional layer 110 that applies a frequency convolution to z[t]. The frequency convolutional layer 110 may have two-hundred fifty-six filters of size 1×8×1 in time-frequency-direction. The frequency convolutional layer 110 may use pooling, e.g., non-overlapping max pooling, along the frequency axis. The frequency convolutional layer may use a pooling size of three.

The multichannel speech recognition system 100 may provide the output of the frequency convolution layer 110 to a linear low-rank projection layer (not shown) to reduce dimensionality. The multichannel speech recognition system 100 may provide the output of the linear low-rank projection layer, or the output of the frequency convolution layer 110, to three long-short term memory (LSTM) layers 112a-c. Each of the three LSTM layers 112a-c may have eight-hundred and thirty-two cells and a five-hundred and twelve unit projection layer. The multichannel speech recognition system 100 provides the output of the three LSTM layers 110a-c to a deep neural network (DNN) layer 112d to predict context-dependent states, e.g., words or sub-word units encoded in the input audio signal. The DNN layer may have 1,024 hidden units.

In some implementations, the multichannel speech recognition system 100 trains the multichannel spatial filtering convolutional layer 102 and the spectral filtering convolutional layer 104 jointly with the rest of the CLDNN, e.g., the with layer 110 and layers 112a-d in the CLDNN block 116. During training, the multichannel speech recognition system 100 may unroll the raw audio signal CLDNN for twenty time steps for training with truncated backpropagation through time. In some examples, the multichannel speech recognition system 100 may delay the output state label by five frames, e.g., to use information about future frames to improve prediction of the current frame. For example, each of the three LSTM layers 112a-c may include information about the five most recently processed frames when processing a current frame.

In some implementations, the multichannel speech recognition system 100 may have two outputs during a training process. The first output may predict context-dependent states, e.g., from a noisy audio signal, and the second output may predict clean log-mel features, e.g., from a clean audio signal that encodes the same words or sub-word units as the noisy audio signal. The multichannel speech recognition system 100 may determine gradients from the layers used to generate each of the two outputs during a backward propagation process. The multichannel speech recognition system 100 may combine the multiple gradients using weights. In some examples, the multichannel speech recognition system 100 may use a multi-task learning (MTL) process during the training to generate the two outputs.

For example, the multichannel speech recognition system 100 may use the output that predicts the clean log-mel features during training, and not during run-time, to regularize network parameters. The multichannel speech recognition system 100 may include one or more denoising layers, e.g., layers 112b-d shown in FIG. 1, and an MTL module, e.g., that includes two deep neural network (DNN) layers 114a-b. In some examples, the MTL module includes a linear low-rank layer after the two DNN layers 114a-b to predict clean log-mel features. In some examples, the multichannel speech recognition system 100 does not predict the clean audio signal, e.g., the words or sub-word units encoded in the clean audio signal, and only predicts log-mel features for the clean audio signal.

The multichannel speech recognition system 100 uses the denoising layers to process noisy audio signals and the MTL module to process clean audio signals. When processing a noisy audio signal, the multichannel speech recognition system 100 uses the denoising layers and does not use the MTL module. When processing a clean audio signal, the multichannel speech recognition system 100 uses the MTL module and does not use the denoising layers, or does not use at least one of the denoising layers depending on a location at which the MTL module is placed in the CLDNN. For instance, when the MTL module is after a first LSTM layer 112a, the multichannel speech recognition system 100 uses the first LSTM layer 112a and the MTL module to process a clean audio signal and does not use the two LSTM layers 112b-c or the DNN layer 112d. When the MTL module is after a second LSTM layer 112b, the multichannel speech recognition system 100 uses the first two LSTM layers 112a-b and the MTL module to process a clean audio signal and does not use the last LSTM layer 112c or the DNN layer 112d.

During training the multichannel speech recognition system 100 back-propagates the gradients from the context-dependent states and MTL outputs by weighting the gradients by α and 1−α, respectively. For instance, the multichannel speech recognition system 100 may receive a first clean audio signal and a second noisy audio signal that is a "corrupted" version of the first clean audio signal, e.g., to which reverberation, noise, or both, have been added to the underlying clean speech features from the first clean audio signal. The multichannel speech recognition system 100 may process, during a single training iteration, both the first clean audio signal and the second noisy audio signal, determine outputs for both audio signals, and then gradients for the multichannel speech recognition system 100 using the outputs for both audio signals, e.g., using respective errors for the outputs. The gradient for the MTL output, e.g., the first clean audio signal, may affect only the layers in the MTL module and not the denoising layers which are not used to process the first clean audio signal. The gradient for the denoising layers, e.g., the second noisy audio signal, may affect only the CLDNN and not the layers in the MTL module.

In some examples, the multichannel speech recognition system 100 may minimize the squared error between the observed features that are corrupted by reverberation and noise, e.g., in the second noisy audio signal, and the underlying clean speech features, e.g., in the first clean audio signal. For instance, if v represents the observed reverberant and noisy speech feature vectors and w represents the underlying clean speech feature vectors, e.g., $\hat{w}_t$ represents the clean features from the clean audio signal and $w_t$ represents the clean features from the noisy audio signal, the MTL objective function used to train this model may be defined by Equation (2) below.

$$T = \alpha \Sigma_t p(s|v_t) + (1-\alpha) \Sigma_t (\hat{w}_t - w_t)^2 \qquad (2)$$

In Equation (2), the first term $p(s|v_t)$ is the primary cross entropy task, e.g., the clean log-mel features determined using the multi-task module, and the second term $(\hat{w}_t - w_t)^2$ is the secondary feature enhancement task, e.g., the context dependent states determined using the denoising layers, and $\alpha$ is the weight parameter which determines how much importance the secondary task should get. In some examples, more weight is given to the first term (cross entropy) compared to the second term (secondary feature enhancement). For instance, $\alpha$ may be 0.9.

In some implementations, during training, the multichannel speech recognition system 100 computes the baseline, e.g., clean, log-mel features with a 25 millisecond window and a 10 millisecond hop. The multichannel speech recognition system 100 may compute raw audio signal features, e.g., noisy audio signal features, with a filter size N of twenty-five milliseconds, or N=four-hundred at a sampling rate of 16 kHz. In some examples, when the input window size is thirty-five millisecond (M=560), the multichannel speech recognition system 100 has a ten millisecond overlapping pooling window.

In some implementations, the multichannel speech recognition system 100 is trained using data from different microphone array geometries. For example, the multichannel speech recognition system 100 may use audio signals received from two microphones spaced fourteen centimeters apart, two microphones spaced ten centimeters apart, three microphones each spaced fourteen centimeters apart, a configuration of four microphones, and other microphone geometries. In some examples, the multichannel speech recognition system 100 is trained with the cross-entropy (CE) criterion, using asynchronous stochastic gradient descent (ASGD) optimization, e.g., all layers in the MTL module and the denoising layers are trained with CE criterion, using ASGD optimization. In some examples, all networks have 13,522 context-dependent output targets. In some examples, the weights of all LSTM layers are randomly initialized using a uniform distribution between −0.02 and 0.02. In some examples, the multichannel speech recognition system 100 may use an exponentially decaying learning rate, initialized to 0.004 and decaying by 0.1 over 15 billion frames.

In some implementations, the multichannel speech recognition system 100 learns filter parameters. For example, the multichannel speech recognition system 100 may learn filter parameters for the multichannel spatial filtering convolutional layer 102. In some examples, training of the filter parameters for the multichannel spatial filtering convolutional layer 102 may allow the multichannel spatial filtering convolutional layer 102 to perform some spectral decomposition.

In some implementations, the output of the multichannel spatial filtering convolutional layer 102 is not directly processed by a non-linear compression, e.g., a rectifier or a log function. For instance, the output of the multichannel spatial filtering convolutional layer 102 may go through other processing to generate intermediate data that is processed by a non-linear compression. In some implementations, the output of the multichannel spatial filtering convolutional layer 102 is not pooled. For instance, the output of the multichannel spatial filtering convolutional layer 102 may go through other processing to generate intermediate data that is pooled.

Figure 2:
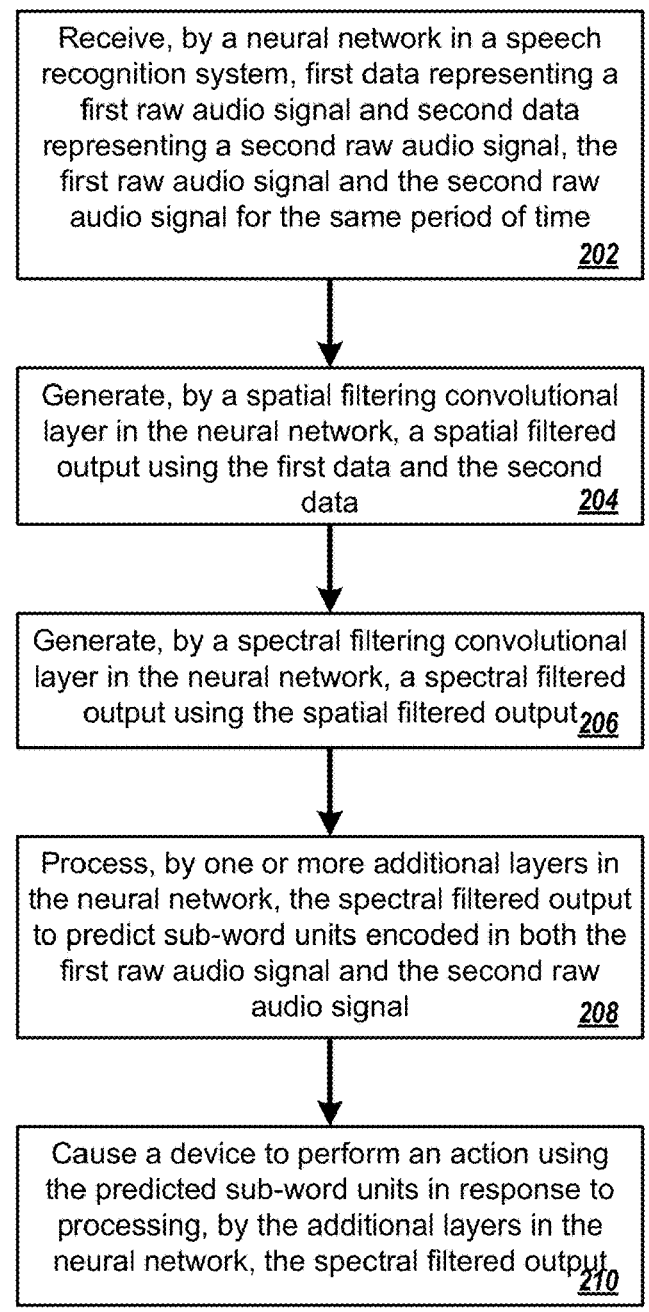
FIG. 2 is a flow diagram of a process for predicting a sub-word unit encoded in two raw audio signals for the same period of time.

FIG. 2 is a flow diagram of a process 200 for predicting a sub-word unit encoded in two raw audio signals for the same period of time. For example, the process 200 can be used by the multichannel speech recognition system 100.

A neural network in a speech recognition system receives first data representing a first raw audio signal and second data representing a second raw audio signal, the first raw audio signal and the second raw audio signal for the same period of time (202). For instance, a device that includes the neural network generates the first data and the second data. The device may include one or more microphones that each generate one of the first data and the second data.

A spatial filtering convolutional layer in the neural network generates a spatial filtered output using the first data and the second data (204). For example, the spatial filtering convolutional layer filters the first data and the second data using multiple finite impulse response filters. The spatial filtering convolutional layer may generate samples from the first data and the second data and stride across the samples in time to generate the spatial filtered output. The spatial filtering convolutional layer may filter the first data and the second data using short-duration multichannel time convolution filters which map multichannel inputs to a single channel. In some implementations, the spatial filtering convolutional layer receives data representing three or more raw audio signals for the same period of time.

A spectral filtering convolutional layer in the neural network generates a spectral filtered output using the spatial filtered output (206). The spectral filtering convolutional layer may generate the spectral filtered output using a second time convolution with a second duration longer than a first duration of the first time convolution used by the spatial filtering convolutional layer. The neural network may pool the spatial filtered output in time, e.g., using non-overlapping max pooling with a pooling size of three. The neural network may apply a rectified non-linearity to the pooled output.

One or more additional layers in the neural network process the spectral filtered output to predict sub-word units encoded in both the first raw audio signal and the second raw audio signal (208). For instance, one or more long short-term memory layers, e.g., three long short-term memory layers, and a deep neural network layer may process the spectral filtered output. The deep neural network may generate a prediction about a sub-word unit encoded in both of the raw audio signals. In some implementations, the deep neural network may generate a prediction about a word encoded in both of the raw audio signals.

The neural network causes a device to perform an action using the predicted sub-word units in response to processing, by the additional layers in the neural network, the spectral filtered output (210). For example, the neural network provides the predicted words or sub-word units to an application that analyzes the words or sub-word units to determine whether the raw audio signals encoded a command, such as a command for an application or device to launch another application or perform a task associated with an application. In some examples, the neural network may combine multiple sub-word units to generate words and provide the generated words, or data representing the words, to the application.

In some implementations, the process 200 can include additional steps, fewer steps, or some of the steps can be divided into multiple steps. For example, the neural network may perform steps 202 through 208 without performing step 210.

Figure 3:
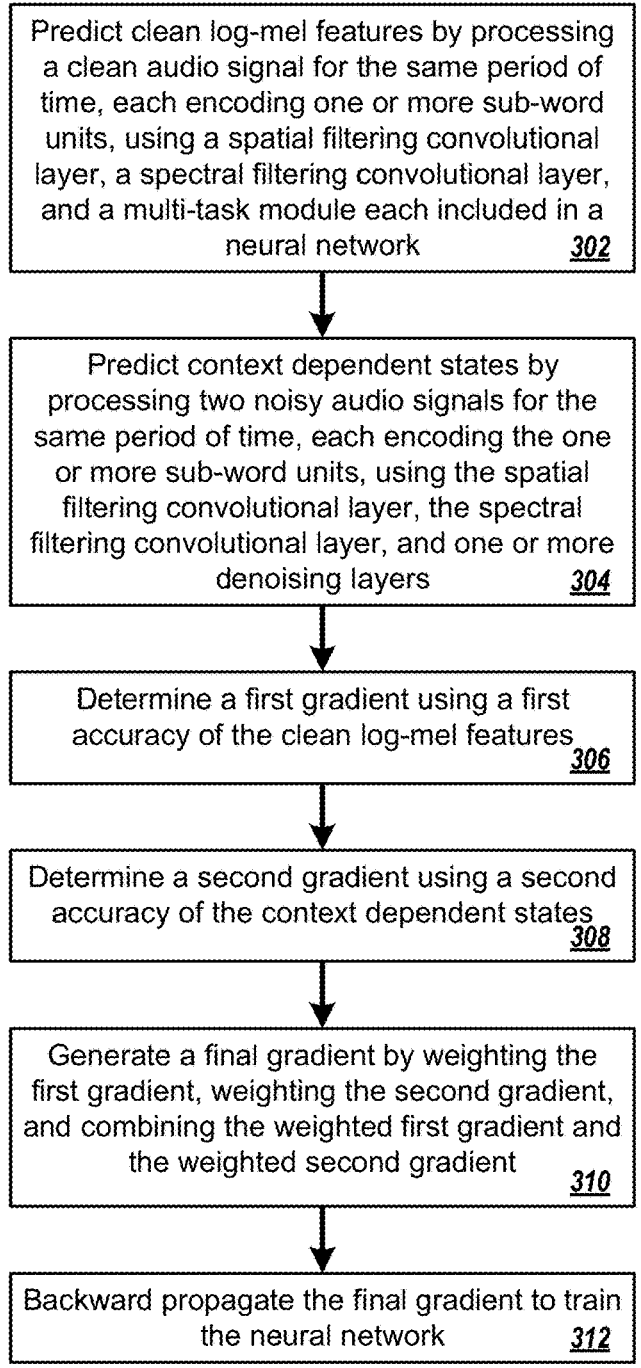
FIG. 3 is a flow diagram of a process for training a neural network that includes a spatial filtering convolutional layer and a spectral filtering convolutional layer.

FIG. 3 is a flow diagram of a process 300 for training a neural network that includes a spatial filtering convolutional layer and a spectral filtering convolutional layer. For example, the process 300 can be used by the multichannel speech recognition system 100.

A system predicts clean log-mel features by processing two clean audio signals for the same period of time, each encoding one or more sub-word units, using a spatial filtering convolutional layer, a spectral filtering convolutional layer, and a multi-task module each included in a neural network (302). For example, a neural network may use the spatial filtering convolutional layer, the spectral filtering convolutional layer, and the multi-task module, e.g., one or more long short-term memory layers and a deep neural network layer, to predict the clean log-mel features. The neural network may receive the raw, clean audio signals and pass the raw, clean audio signals to the spatial filtering convolutional layer to generate spatial filtered output. The neural network may provide the spatial filtered output to the spectral filtering convolutional layer to generate spectral filtered output. The neural network may provide the spectral filtered output to the multi-task module to generate the clean log-mel features.

The raw, clean audio signal does not include noise, e.g., background noise, or noise above a threshold level. The system may receive the two raw, clean audio signals from a single device, e.g., which generated the signals using two microphones, each of which generated one of the raw, clean audio signals. In some examples, the system may retrieve the raw, clean audio signals from a memory when the two raw, clean audio signals were previously generated from two microphones to represent a stereo audio signal. The two raw, clean audio signals may be generated using any appropriate method to create stereo audio signals.

A system predicts context dependent states by processing two noisy audio signals for the same period of time, each encoding the one or more sub-word units, using the spatial filtering convolutional layer, the spectral filtering convolutional layer, and one or more denoising layers (304). For instance, the neural network uses the spatial filtering convolutional layer, the spectral filtering convolutional layer, and the denoising layers to predict the context dependent states. The neural network may receive a raw, noisy audio signal and pass the raw, noisy audio signal to the spatial filtering convolutional layer to generate spatial filtered output. The neural network may provide the spatial filtered output to the spectral filtering convolutional layer to generate spectral filtered output. The neural network may provide the spectral filtered output to the denoising layers, e.g., one or more deep neural network layers different than the deep neural network layer that processed the raw, clean audio signal. The denoising layers may generate a prediction of the context dependent states for the raw, noisy audio signal using the spectral filtered output. The system may generate the raw, noisy audio signal from the raw, clean audio signal by adding noise to the raw, clean audio signal, e.g., by adding noise above the threshold level to the raw, clean audio signal.

A system determines a first gradient using a first accuracy of the clean log-mel features (306). For example, the system compares the predicted clean log-mel features (determined using step 302) with expected log-mel features to determine the first accuracy. The system may use any appropriate method to determine the first gradient, the first accuracy, or both. In some examples, the system may select a gradient to minimize the error between the predicted clean log-mel features and the expected log-mel features.

A system determines a second gradient using a second accuracy of the context dependent states (308). For instance, the system compares the predicted context dependent states (determined using step 304) with expected context dependent states to determine the second accuracy. The system may use any appropriate method to determine the second gradient, the second accuracy, or both. In some examples, the system may select a gradient to minimize the error between the predicted context dependent states and the expected context dependent states.

A system generates a final gradient by weighting the first gradient, weighting the second gradient, and combining the weighted first gradient and the weighted second gradient (310). The system may determine weights for each of the first gradient and the second gradient using an importance of the corresponding task. In some examples, the system may use Equation (2) above to weight the first gradient and the second gradient.

A system backward propagates the final gradient to train the neural network (312). For instance, the system uses gradient descent with the final gradient to train the neural network.

The order of steps in the process 300 described above is illustrative only, and the training of the neural network can be performed in different orders. For example, the system may predict the context dependent states and then predict the clean log-mel features. The system may determine the second gradient and then determine the first gradient. In some examples, the system may predict the clean log-mel features and then determine the first gradient before predicting the content dependent states. In some implementations, the system may predict the context dependent states and determine the second gradient and then predict the clean log-mel features.

In some implementations, the process 300 can include additional steps, fewer steps, or some of the steps can be divided into multiple steps. For example, the system may provide the neural network, e.g., the spatial filtering convolutional layer, the spectral filtering convolutional layer, and the multi-task module, to a device for predicting sub-word units or words encoded in both a first raw audio signal and a second raw audio signal for the same period of time. In some examples, the device may predict words encoded in multiple raw audio signals. The device may predict words encoded in three or more raw audio signals.

In some implementations, one or more servers may train the neural network. Once the neural network is trained, at least one of the servers may provide the neural network to a device, e.g., a user device, for use predicting words or sub-word units included in multiple raw audio signals.

In some implementations, a single device may train and use the neural network to predict the words or sub-word units. In some implementations, a first device may train the neural network and provide the neural network to a second, different device, for use.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 4:
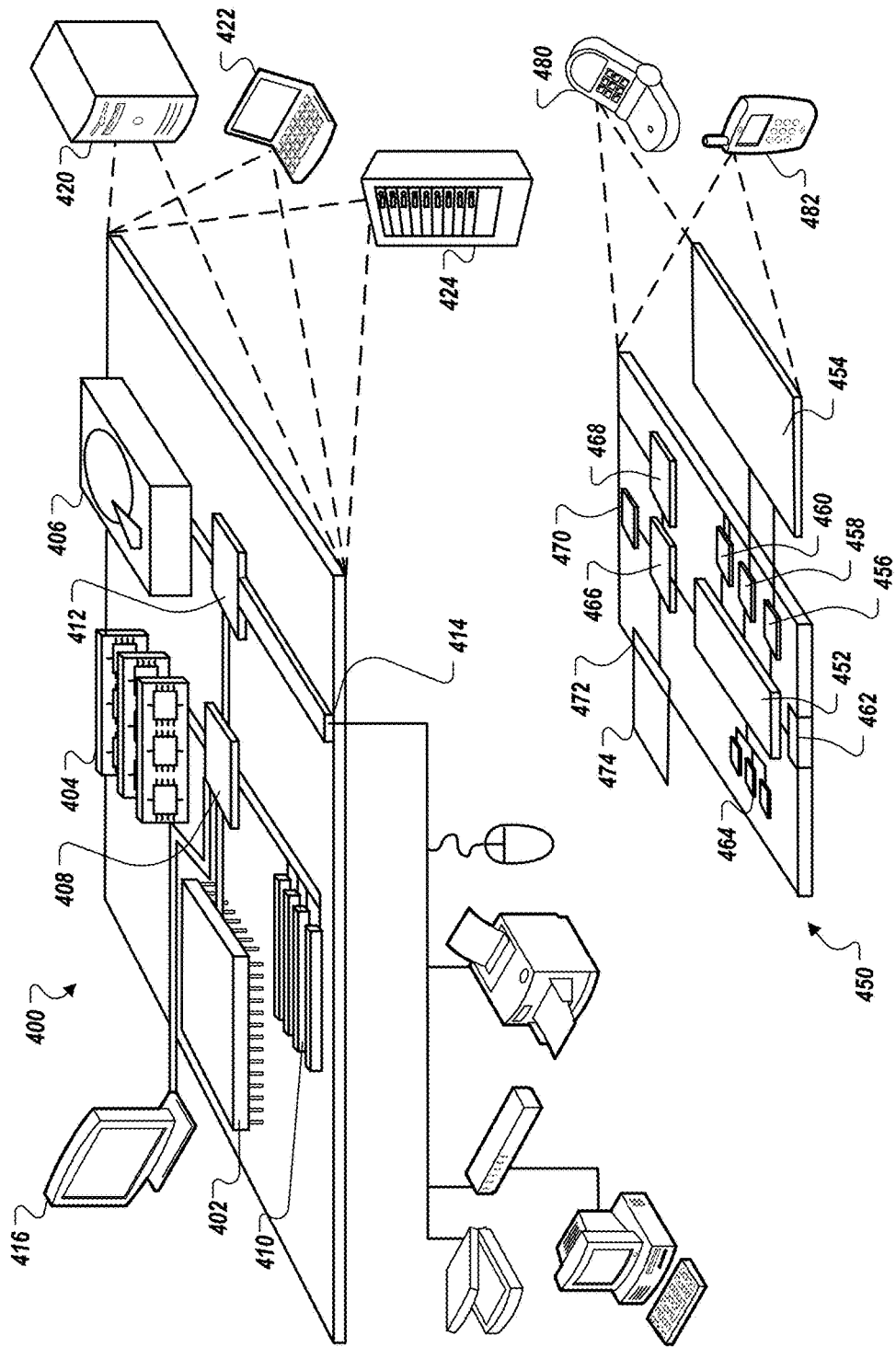
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, by a neural network in a speech recognition system, first data representing a first raw audio signal generated by a first microphone and second data representing a second raw audio signal generated by a second microphone that is a different microphone from the first microphone, wherein the first raw audio signal and the second raw audio signal correspond to the same period of time;
   generating a spatial filtered output for a single combined channel comprising performing a first time convolution on the first data and the second data using a spatial filtering convolutional layer in the neural network, wherein the first time convolution is performed using one or more multichannel filters spanning a first length in time, the spatial filtered output comprising one or more feature maps generated without pooling outputs of the first time convolution;
   generating a spectral filtered output comprising performing a second time convolution on the one or more feature maps of the spatial filtered output using a spectral filtering convolutional layer, wherein the second time convolution is performed using one or more single-channel filters spanning a second length in time that is longer than the first length in time for the first time convolution;
   processing, using one or more additional layers in the neural network, the spectral filtered output to predict sub-word units encoded in both the first raw audio signal and the second raw audio signal; and
   in response to processing, using the one or more additional layers in the neural network, the spectral filtered output, causing a device to perform an action using the predicted sub-word units.

2. The method of claim 1, wherein the first time convolution is performed using multiple multichannel time convolution filters that map multichannel inputs to a single channel.

3. The method of claim 1, wherein the one or more multichannel filters comprise multiple finite impulse response filters.

4. The method of claim 1, wherein generating the spatial filtered output comprises:
   filtering the first data using each of a plurality of filters; and
   filtering the second data using each of the plurality of filters.

5. The method of claim 1, wherein generating the spatial filtered output comprises:
   generating a first quantity of first samples from the first data;
   generating a second quantity of second samples from the second data, the second quantity and the first quantity being the same quantity;
   striding in time across the first samples to generate first spatial output; and
   striding in time across the second samples to generate second spatial output.

6. The method of claim 5, wherein generating the spatial filtered output comprises:

summing first values in the first spatial output with corresponding values in the second spatial output to generate an output feature map, wherein the spatial filtered output for the single combined channel comprises the output feature map.

7. The method of claim 1, wherein generating the spectral filtered output using the spatial filtered output comprises pooling output of the spectral filtering convolutional layer in time to generate a pooled output.

8. The method of claim 7, wherein pooling the output of the spectral filtering convolutional layer in time to generate the pooled output comprises performing non-overlapping max pooling in time.

9. The method of claim 7, wherein pooling the output of the spectral filtering convolutional layer in time to generate the pooled output comprises using a pooling size of three to generate the pooled output.

10. The method of claim 7, wherein generating the spectral filtered output comprises applying a rectified non-linearity to the pooled output.

11. The method of claim 1, wherein processing, using the one or more additional layers in the neural network, the spectral filtered output to predict sub-word units encoded in both the first raw audio signal and the second raw audio signal comprises processing, using a long short-term memory deep neural network included in the neural network, the spectral filtered output to predict sub-word units encoded in both the first raw audio signal and the second raw audio signal.

12. The method of claim 11, wherein processing, using the long short-term memory deep neural network included in the neural network, the spectral filtered output to predict sub-word units encoded in both the first raw audio signal and the second raw audio signal comprises:
    processing, using a linear low-rank projection layer in the neural network, the spectral filtered output to generate a first intermediate output; and
    processing, using a long short-term memory layer in the long short-term memory deep neural network, the first intermediate output to generate a second intermediate output.

13. The method of claim 12, wherein processing, using the long short-term memory deep neural network included in the neural network, the spectral filtered output to predict sub-word units encoded in both the first raw audio signal and the second raw audio signal comprises processing, using a deep neural network layer in the long short-term memory deep neural network, data from the second intermediate output to predict the sub-word units encoded in both the first raw audio signal and the second raw audio signal.

14. The method of claim 1, wherein
    the first raw audio signal includes a quantity of samples;
    the second raw audio signal includes the quantity of samples; and
    generating the spatial filtered output for the single combined channel using the first data and the second data comprises generating, using the spatial filtering convolutional layer in the neural network with the first time convolution using the first data and the second data, the spatial filtered output for the single combined channel that has a value for each of the samples in the quantity of samples.

15. The method of claim 1, wherein causing the device to perform an action using the predicted sub-word units comprises:
    providing the predicted sub-word units to an application to cause the device to determine whether the predicted sub-word units encode a command; and
    in response to determining that the predicted sub-word unites likely encode a command, performing, by the device, an action for the command.

16. The method of claim 1, wherein causing the device to perform an action using the predicted sub-word units comprises:
    generating, using the predicted sub-word units, data representing words that include the predicted sub-word units; and
    providing, to the device, the data representing the words that include the predicted sub-word units to cause the device to perform an action using the data representing the words.

17. One or more non-transitory computer-readable storage media storing instructions executable by a data processing apparatus and upon such execution cause the data processing apparatus to perform operations comprising:
    receiving, by a neural network in a speech recognition system, first data representing a first raw audio signal generated by a first microphone and second data representing a second raw audio signal generated by a second microphone that is a different microphone from the first microphone, the first raw audio signal and the second raw audio signal for the same period of time;
    generating, using a spatial filtering convolutional layer in the neural network with a first time convolution having a first length in time, a spatial filtered output using the first data and the second data;
    generating, using a spectral filtering convolutional layer in the neural network with a second time convolution having a second length in time that is longer than the first length in time for the first time convolution, a spectral filtered output using the spatial filtered output;
    processing, using one or more additional layers in the neural network, the spectral filtered output to predict sub-word units encoded in both the first raw audio signal and the second raw audio signal, comprising:
        performing a frequency convolution on the spectral filtered output using a frequency convolution layer of the neural network;
        pooling output of the frequency convolution in frequency;
        processing, using a linear low-rank projection layer in the neural network, the pooled output of the frequency convolution to generate a first intermediate output; and
        processing the first intermediate output using one or more long short-term memory layers of the neural network to generate a second intermediate output; and
        using one or more deep neural network layer of the neural network to process the second intermediate output to predict the sub-word units encoded in both the first raw audio signal and the second raw audio signal; and
    in response to processing, using the one or more additional layers in the neural network, the spectral filtered output, causing a device to perform an action using the predicted sub-word units.

18. A speech recognition system comprising:
    a data processing apparatus; and
    a non-transitory computer readable storage medium in data communication with the data processing apparatus and storing instructions executable by the data processing apparatus and upon such execution cause the data processing apparatus to perform operations comprising:
receiving, by a neural network in a speech recognition system, first data representing a first raw audio signal generated by a first microphone and second data representing a second raw audio signal generated by a second microphone that is a different microphone from the first microphone, wherein the first raw audio signal and the second raw audio signal correspond to the same period of time;
generating a spatial filtered output for a single combined channel comprising performing a first time convolution on the first data and the second data using a spatial filtering convolutional layer in the neural network, wherein the first time convolution is performed using one or more multichannel filters spanning a first number of values, the spatial filtered output comprising one or more feature maps generated without pooling outputs of the first time convolution;
generating a spectral filtered output comprising performing a second time convolution on the one or more feature maps of the spatial filtered output using a spectral filtering convolutional layer, wherein the second time convolution is performed using one or more single-channel filters spanning a second number of values that is longer than the first length in time for the first time convolution;
processing, using one or more additional layers in the neural network, the spectral filtered output to predict sub-word units encoded in both the first raw audio signal and the second raw audio signal; and
in response to processing, using the one or more additional layers in the neural network, the spectral filtered output, causing a device to perform an action using the predicted sub-word units.

19. The system of claim 18, wherein the first time convolution is performed using multiple multichannel time convolution filters that map multichannel inputs to a single channel.

20. The system of claim 18, wherein the one or more multichannel filters comprise multiple finite impulse response filters.

21. The system of claim 18, wherein generating the spatial filtered output comprises:
filtering the first data using each of a plurality of filters; and
filtering the second data using each of the plurality of filters.

22. The system of claim 18, wherein generating the spatial filtered output comprises:
generating a first quantity of first samples from the first data;
generating a second quantity of second samples from the second data, the second quantity and the first quantity being the same quantity;
striding by one in time across each of the first samples to generate first spatial output; and
striding by one in time across each of the second samples to generate second spatial output.

23. The system of claim 22, wherein generating the spatial filtered output comprises:
summing first values in the first spatial output with corresponding values in the second spatial output to generate an output feature map, wherein the spatial filtered output comprises the output feature map.

24. The system of claim 18, wherein generating the spectral filtered output comprises pooling output of the spectral filtering convolutional layer in time to generate a pooled output.

25. The system of claim 18, wherein processing, using the one or more additional layers in the neural network, the spectral filtered output to predict sub-word units encoded in both the first raw audio signal and the second raw audio signal comprises processing, using a long short-term memory deep neural network included in the neural network, the spectral filtered output to predict sub-word units encoded in both the first raw audio signal and the second raw audio signal.

* * * * *